(12) United States Patent
Lee et al.

(10) Patent No.: US 12,387,354 B2
(45) Date of Patent: Aug. 12, 2025

(54) IMAGE DEPTH RECOGNITION METHOD, ELECTRONIC DEVICE, AND STORAGE MEDIUM

(71) Applicant: HON HAI PRECISION INDUSTRY CO., LTD., New Taipei (TW)

(72) Inventors: Chieh Lee, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 480 days.

(21) Appl. No.: 18/088,250

(22) Filed: Dec. 23, 2022

(65) Prior Publication Data
US 2024/0005539 A1 Jan. 4, 2024

(30) Foreign Application Priority Data

Jul. 4, 2022 (CN) .......................... 202210785689.8

(51) Int. Cl.
*G06T 7/55* (2017.01)
*G06T 7/73* (2017.01)
*G06V 10/764* (2022.01)

(52) U.S. Cl.
CPC .................. *G06T 7/55* (2017.01); *G06T 7/74* (2017.01); *G06V 10/764* (2022.01); *G06T 2207/10024* (2013.01); *G06T 2207/20068* (2013.01); *G06T 2207/20084* (2013.01); *G06T 2207/30244* (2013.01)

(58) Field of Classification Search
CPC .... G06T 7/55; G06T 7/74; G06T 7/20; G06T 7/50; G06T 7/70; G06T 2207/10024; G06T 2207/20068; G06T 2207/20084; G06T 2207/30244; G06T 2207/10016; G06T 2207/20081; G06T 2207/30252; G06V 10/764; G06V 10/82; G06V 20/58; G06V 20/588; G06N 3/08

See application file for complete search history.

(56) References Cited

U.S. PATENT DOCUMENTS

| 10,671,082 B2 * | 6/2020 | Huang ................. H04N 13/254 |
| 2022/0076448 A1 * | 3/2022 | Liu ............................ G06T 7/75 |
| 2022/0156525 A1 * | 5/2022 | Guizilini ................ G06N 3/084 |

FOREIGN PATENT DOCUMENTS

TW 202143174 11/2021

* cited by examiner

Primary Examiner — John B Strege
(74) Attorney, Agent, or Firm — ScienBiziP, P.C.

(57) ABSTRACT

An image depth recognition method held in a storage medium and running in a disclosed electronic device acquires images to be recognized and two original images. An original image is recognized through a depth recognition network to obtain an initial depth image, and a pose absolute value matrix is generated based on the two processed original images and a pose network, the pose network and the initial depth image generating an initial projection image. The processed two original images are recognized according to the pose absolute value matrix and the preset threshold matrix and adjusted based on errors between the initial depth image, the target image, and the target projection image. The depth recognition network obtains a depth recognition model, and the depth information of the image can be recognized. The method can improve the accuracy of the depth recognition of the image.

20 Claims, 4 Drawing Sheets

IMAGE DEPTH RECOGNITION METHOD, ELECTRONIC DEVICE, AND STORAGE MEDIUM

FIELD

The present disclosure relates to image processing technologies, in particular to an image depth recognition method, an electronic device, and a storage medium.

BACKGROUND

Generally, in relation to recognition of vehicles in images, training images are used to train deep networks. However, because the used training images usually include static objects and dynamic objects, the movement of dynamic objects may cause poor training accuracy of the deep network. Thus, the trained depth recognition model cannot accurately recognize depth information of the vehicle images.

DETAILED DESCRIPTION

In order to provide a clearer understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing embodiments and are not intended to limit the present disclosure.

Figure 1:
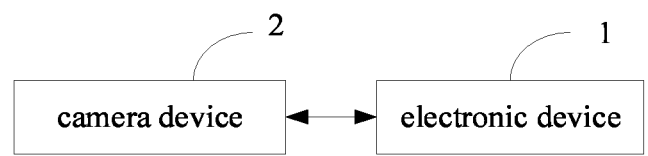
FIG. 1 is a block diagram of an electronic device connected with a camera device provided in an embodiment of the present application.

FIG. 1 is a block diagram of an electronic device connected with a camera device provided in an embodiment of the present application. The image depth recognition method can be applied to one or more electronic devices 1, the electronic device 1 communicates with a camera device 2, and the camera device 2 can be a monocular camera or other device that achieves photographing.

The electronic device 1 is a device that can automatically perform parameter value calculation and/or information processing according to pre-set or stored instructions, and its hardware includes, but is not limited to: a microprocessor, an application specific integrated circuit (Application Specific Integrated Circuit) Circuit, ASIC), programmable gate array (Field-Programmable Gate Array, FPGA), digital signal processor (Digital Signal Processor, DSP), embedded devices, etc.

The electronic device 1 may be any electronic product that can interact with a user, such as a personal computer, a tablet computer, a smart phone, a personal digital assistant (PDA), a game console, and an interactive network television. (Internet Protocol Television, IPTV), smart wearable devices, etc.

The electronic device 1 may also include network equipment and/or user equipment. Wherein, the network device includes, but is not limited to, a single network server, a server group formed by multiple network servers, or a cloud formed by many hosts or network servers based on cloud computing (Cloud Computing).

The network including the electronic device 1 includes, but is not limited to, the Internet, a wide area network, a metropolitan area network, a local area network, a virtual private network (Virtual Private Network, VPN), and the like.

Figure 2:
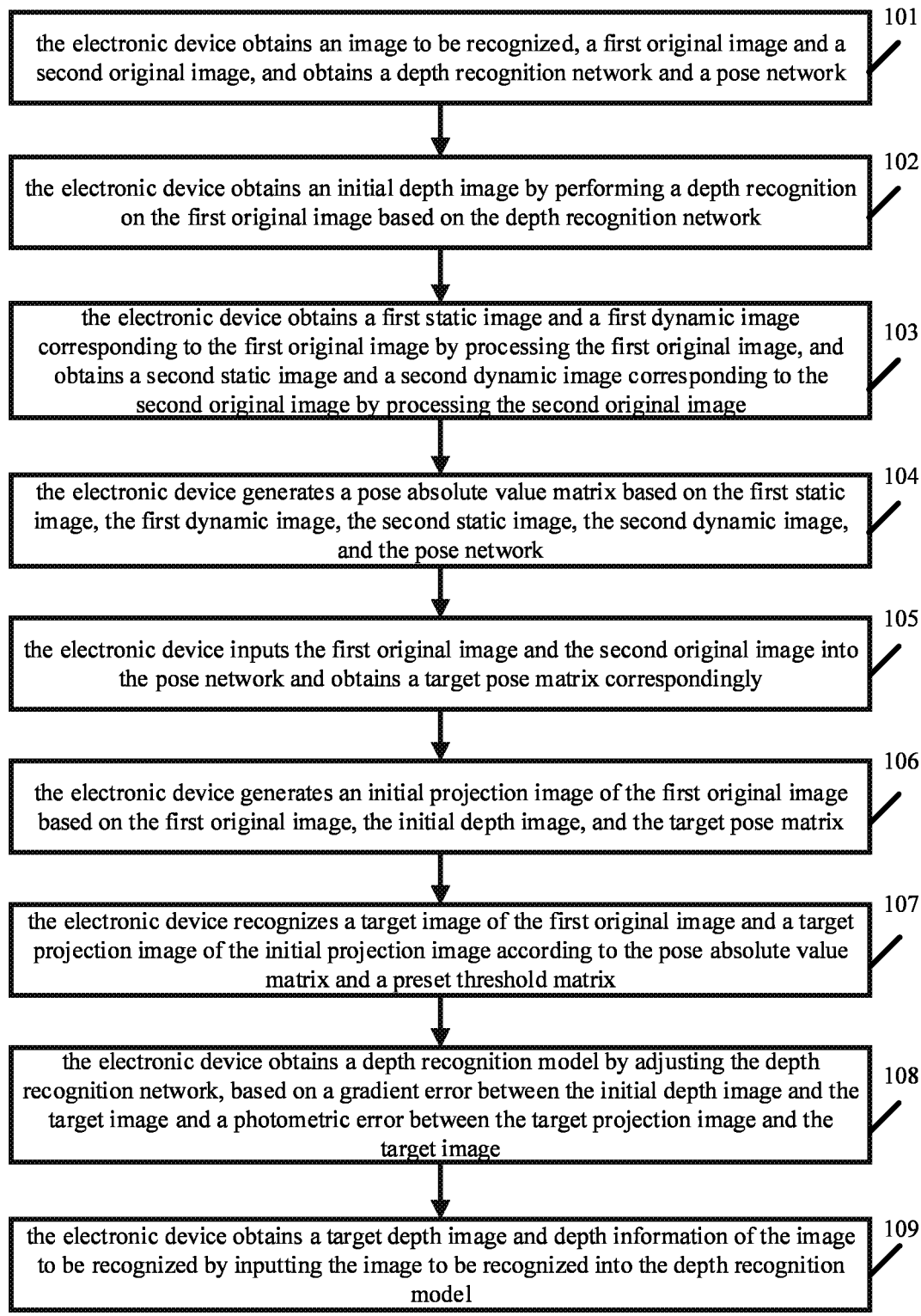
FIG. 2 is a flowchart of an image depth recognition method provided in an embodiment of the present application.

FIG. 2 is a flowchart of an image depth recognition method provided in an embodiment of the present application. According to different needs, the order of the steps in the flowchart can be changed, and some can be omitted. The element executing the image depth recognition method is an electronic device, such as the electronic device 1 shown in FIG. 1.

At block 101, the electronic device obtains an image to be recognized, a first original image and a second original image, and obtains a depth recognition network and a pose network.

In at least one embodiment of the present application, the image to be recognized refers to an image for which depth information needs to be recognized.

In at least one embodiment of the present application, the first original image and the second original image are images showing three primary colors (Red Green Blue (RGB)) of adjacent frames. A time of generating the second original image is longer than a time of generating the first original image. The first original image and the second original image may include objects such as vehicles, roads and paths, pedestrians, sky, trees, etc. The first original image and the second original image contain substantially the same initial objects.

In at least one embodiment of the present application, the electronic device obtaining the image to be recognized includes:

The electronic device controls the camera device to photograph a target scene and obtains the image to be recognized.

Wherein, the target scene may include target objects such as vehicles, roads and paths, and pedestrians.

In at least one embodiment of the present application, the electronic device obtains the first original image and the second original image from a preset database, and the preset database may be a KITTI database, a Cityscapes database, and a vKITTI database etc.

In at least one embodiment of the present application, the depth recognition network can be a deep neural network. The pose network refers to a convolutional neural network that recognizes attitudes and poses, the depth recognition network and the pose network can be obtained from databases on the Internet.

At block 102, the electronic device obtains an initial depth image by performing a depth recognition on the first original image based on the depth recognition network.

In at least one embodiment of the present application, the initial depth image refers to an image containing depth information. The depth information refers to a distance between the initial object corresponding to each pixel in the first original image and a camera device that photographs the first original image. The camera device can be a monocular camera.

In at least one embodiment of the present application, the deep recognition network includes a convolutional layer and a deconvolutional layer.

In at least one embodiment of the present application, the electronic device obtaining an initial depth image by performing a depth recognition on the first original image based on the depth recognition network includes:

The electronic device inputs the first original image into the convolution layer to perform a convolution operation, obtains an initial feature map corresponding to the first original image, and inputs the initial feature map into the deconvolution layer to perform a deconvolution operation to obtain a high-dimensional feature map. Further, the electronic device maps the distance between each pixel and the camera device to a depth value of each pixel in the high-dimensional feature map. Further, the electronic device generates the initial depth image based on each pixel and a pixel value of each pixel.

Through the above-mentioned embodiments, since the depth value of each pixel can reflect the real distance between each pixel on the first original image and the camera device, projected coordinates can be accurately calculated through the initial depth image.

At block 103, the electronic device obtains a first static image and a first dynamic image corresponding to the first original image by processing the first original image, and obtains a second static image and a second dynamic image corresponding to the second original image by processing the second original image.

In at least one embodiment of the present application, the first original image includes a plurality of initial objects.

In at least one embodiment of the present application, the first static image refers to an image generated after performing a mask processing on dynamic objects in the first original image, and the second static image refers to an image generated after performing a mask processing on dynamic objects in the second original image. The dynamic objects refer to objects that are moving, for example, the dynamic objects can be pedestrians and vehicles. The first dynamic image refers to an image generated after performing a mask processing on static objects in the first original image, the second dynamic image refers to an image generated after performing a mask processing on static objects in the second original image. The static objects refer to objects that do not move, for example, the static objects may be trees, roads and paths, road signs, and the like.

In at least one embodiment of the present application, the electronic device obtaining a first static image and a first dynamic image corresponding to the first original image by processing the first original image includes:

The electronic device calculates a score value of each pixel in the first original image based on a pixel value of each pixel in the first original image. Further, based on the score value and a plurality of preset objects, the electronic device calculates a category probability of each pixel in the first original image on each preset object. Further, the electronic device determines a preset object corresponding to a category probability with a largest value as a pixel object corresponding to the pixel and determines a pixel area including the pixels of the same pixel object in the first original image as an initial object. Further, the electronic device classifies the initial object according to preset rules and obtains the dynamic objects corresponding to dynamic categories and the static objects corresponding to static categories in the first original image. Further, the electronic device performs the mask processing on the dynamic objects in the first original image and obtains the first static image. The mask processing is performed on the static objects in the first original image and the first dynamic image is thereby obtained.

In at least one embodiment of the present application, the preset rule determines initial objects belonging to means of transportation, persons, or animals, etc. as movable initial objects, and determines the movable initial objects as the dynamic categories. The preset rule determines initial objects belonging to plants, fixed objects, etc. as immovable initial objects, and determines the initial categories corresponding to the immovable initial objects as the static categories. For example, initial objects such as pedestrians, cats, dogs, bicycles, and cars that can move are determined as the dynamic categories, and initial objects such as sky, trees, street lamps, and buildings that cannot be moved are determined as the static categories.

Specifically, a formula for calculating the category probability is:

$$S_i = \frac{e^{z_j}}{\sum_j^k e^{z_j}} i = 1, 2, \ldots, k;$$

Wherein, $S_i$ represents a category probability that each pixel belongs to the i-th preset object, $e^{z_j}$ represents a score value of the j-th pixel in the first original image, and $z_j$ represents a pixel value of the j-th pixel in the first original image. $\Sigma_j^k e^{z_j}$ represents a total score value of all pixels in the first original image, i represents the i-th preset object, and k represents a number of the plurality of preset objects.

In at least one embodiment of the present application, the generation process of the second static image is basically the same as that of the first static image, and the generation process of the second dynamic image is basically the same as the first dynamic image, so the present application is not repeated here.

Through the above-mentioned embodiments, the pixel area including the pixels of the same object in the first original image are determined as the original objects, and the initial objects are preliminarily classified according to the preset rules, so that the positions of the dynamic objects and the static objects in the first original image can be preliminarily determined, the dynamic objects and the static objects can be accurately masked according to the positions.

At block 104, the electronic device generates a pose absolute value matrix based on the first static image, the first dynamic image, the second static image, the second dynamic image, and the pose network.

In at least one embodiment of the present application, the pose absolute value matrix refers to a matrix generated by a plurality of absolute values of poses. An absolute value of a pose refers to an absolute value of a difference between an element in a static pose matrix and a corresponding element in a dynamic pose matrix. The static pose matrix refers to a matrix generated according to the first static image and the second static image, and the dynamic pose matrix refers to a matrix generated according to the first dynamic image and the second dynamic image.

In at least one embodiment of the present application, the electronic device generating a pose absolute value matrix based on the first static image, the first dynamic image, the second static image, the second dynamic image, and the pose network includes:

The electronic device inputs the first static image and the second static image into the pose network and obtains a static pose matrix. The electronic device inputs the first dynamic image and the second dynamic image into the pose network and obtains a dynamic pose matrix. Further, the electronic device performs a subtraction operation on each matrix element in the static pose matrix and the corresponding matrix element in the dynamic pose matrix and obtains pose differences. Further, the electronic device takes an absolute value of the pose differences and obtains absolute values of the pose of each matrix element in the static pose matrix. Further, according to an element position of each matrix element in the static pose matrix, the electronic device arranges the absolute values of the pose and obtains the absolute value matrix of the pose.

In the present embodiment, a generation method of the static pose matrix and the dynamic pose matrix is basically the same as a generation method of a target pose matrix hereinafter, so the present application is not repeated here.

Through the above-mentioned embodiments, since the static pose matrix includes the positions and poses of the static objects, and the dynamic pose matrix includes the positions and poses of the dynamic objects, the static pose matrix can accurately reflect the state of the static objects, and the dynamic pose matrix can accurately reflect the state of the dynamic objects. When the dynamic objects do not move, the dynamic pose matrix is basically the same as the static pose matrix. Whether the dynamic objects are moving or is not moving are determined through an operation result of the absolute value of the pose and a corresponding threshold, which can avoid the influence of errors.

At block 105, the electronic device inputs the first original image and the second original image into the pose network and obtains a target pose matrix correspondingly.

In at least one embodiment of the present application, the target pose matrix refers to a transformation from a camera coordinate of each pixel in the first original image to a world coordinate. The camera coordinate of each pixel in the first original image refer to a coordinate of each pixel in a camera coordinate system.

Figure 3:
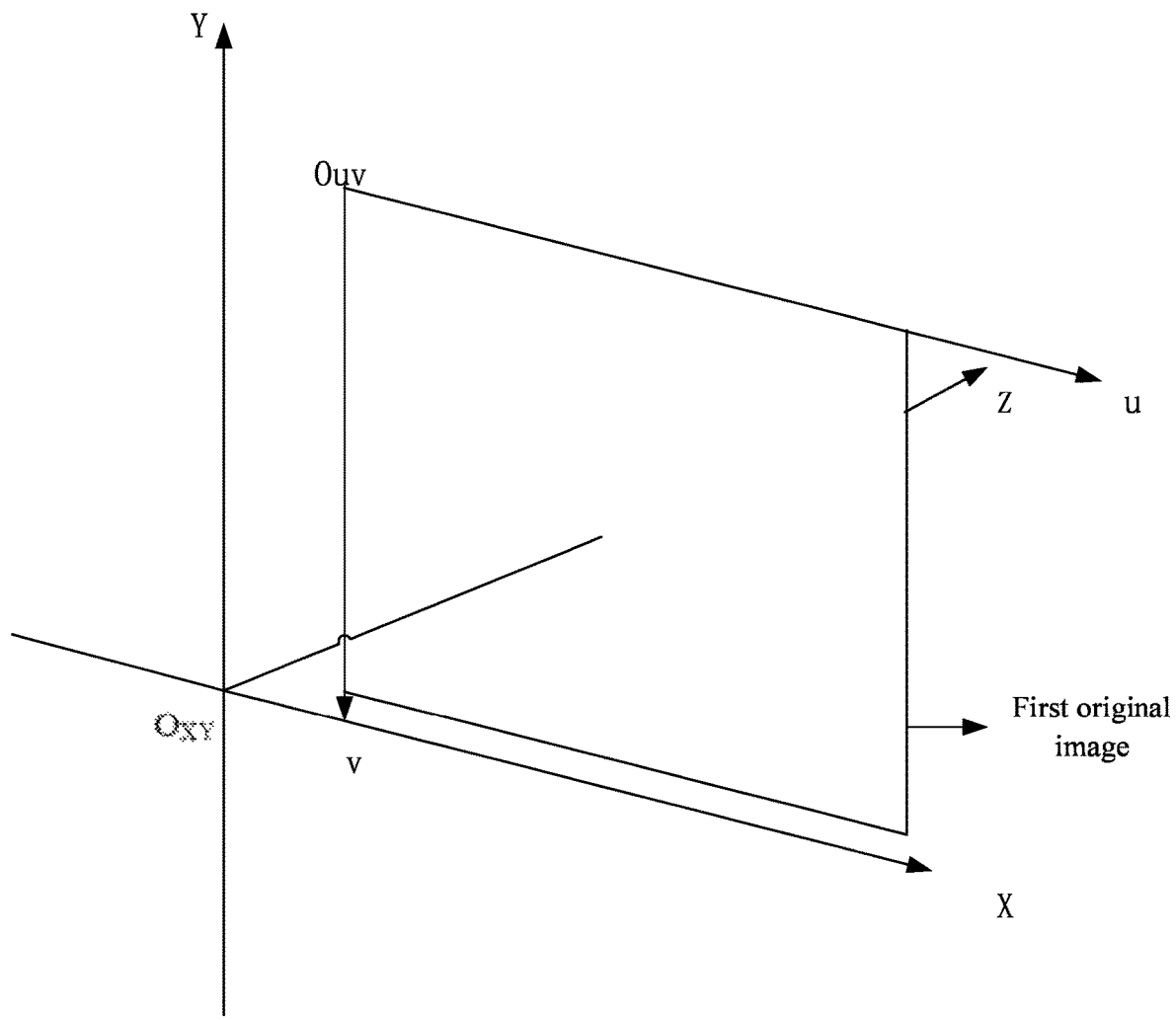
FIG. 3 is a schematic diagram of a pixel coordinate system and a camera coordinate system based on an image, provided in an embodiment of the present application.

FIG. 3 shows a pixel coordinate system and a camera coordinate system based on an image provided in an embodiment of the present application. The electronic device takes a pixel Ouv in a first row and a first column of the first original image as a point of origin, takes a parallel line where the pixels in the first row are located as a u-axis, and takes as a v-axis a vertical line where the pixels in the first column are located to build a pixel coordinate system. In addition, the electronic device takes a light spot OXY of the monocular camera as an origin point, takes an optical axis of the monocular camera as Z-axis, takes a parallel line of the u-axis of the pixel coordinate system as X-axis, and takes a line parallel to the v-axis of the pixel coordinate system as Y-axis, to build a camera coordinate system.

In at least one embodiment of the present application, the electronic device inputting the first original image and the second original image into the pose network and obtaining a target pose matrix correspondingly includes:

The electronic device determines pixels corresponding to the dynamic objects in the first original image as first pixels. Further, the electronic device obtains a first homogeneous coordinate matrix of the first pixels and obtains a second homogeneous coordinate matrix of second pixels in the second original image corresponding to the first pixels. Further, the electronic device obtains an inverse matrix of an internal parameter matrix of the camera device. Further, the electronic device calculates first camera coordinates of the first pixels according to the first homogeneous coordinate matrix and the inverse matrix of the internal parameter matrix and calculates second camera coordinates of the second pixels according to the second homogeneous coordinate matrix and the inverse matrix of the internal parameter matrix. Further, the electronic device calculates the first camera coordinates and the second camera coordinates based on a preset epipolar constraint relationship and obtains a rotation matrix and a translation matrix, and obtains the target pose matrix by splicing the rotation matrix and the translation matrix.

Wherein, the first homogeneous coordinate matrix of the first pixel refers to a matrix with an additional dimension, being one more dimension than that of the pixel coordinate matrix, and an element value of the extra dimension is 1. The pixel coordinate matrix refers to a matrix generated according to first pixel coordinates of the first pixel. The first pixel coordinates refer to coordinates of the first pixels in the pixel coordinate system. For example, the first pixel coordinate of the first pixel in the pixel coordinate system may be (u, v), and the pixel coordinate matrix of the first pixel may be $$\begin{bmatrix} u \\ v \end{bmatrix};$$

then the homogeneous coordinate matrix of the first pixel is $$\begin{bmatrix} u \\ v \\ 1 \end{bmatrix}.$$

Multiplying the first homogeneous coordinate matrix and the inverse matrix of the internal parameter matrix, the first camera coordinate of the first pixel point is obtained. Multiplying the second homogeneous coordinate matrix and the inverse matrix of the internal parameter matrix. the second camera coordinate of the second pixel point is obtained.

Wherein, the generation method of the second homogeneous coordinate matrix is basically the same as the generation method of the first homogeneous coordinate matrix, which will not be repeated in the present application.

The target rotation matrix can be expressed as:

$$\text{pose} = \begin{bmatrix} R & t \\ 0 & 1 \end{bmatrix};$$

Wherein, pose is the target pose matrix, the target pose matrix is a 4×4 matrix, R is the rotation matrix, the rotation matrix is a 3×3 matrix, t is the translation matrix, and the translation matrix is a 3×1 matrix.

Wherein, a formula for calculating the translation matrix and the rotation matrix is:

$$K^{-1}p_1(txR)(K^{-1}p_2)^T = 0;$$

Wherein, $K^{-1}p_1$ is the first camera coordinate, $K^{-1}p_2$ is the second camera coordinate, $p_1$ is the first homogeneous coordinate matrix, $p_2$ is the second homogeneous coordinate matrix, and $K^{-1}$ is the inverse matrix of the internal parameter matrix.

Through the above-mentioned embodiment, according to the internal parameter matrix of the camera device and converting two-dimensional pixel coordinates of each pixel in the first original image and the second original image into three-dimensional camera coordinates in the camera coordinate system, the rotation matrix and the translation matrix can be accurately calculated, so that the target pose matrix is accurately generated according to the rotation matrix and the translation matrix.

At block 106, the electronic device generates an initial projection image of the first original image based on the first original image, the initial depth image, and the target pose matrix.

In at least one embodiment of the present application, the initial projection image is an image representing a transformation process. The transformation process refers to a transformation process between the pixel coordinates of the pixels in the original image and the corresponding pixel coordinates in the second original image.

In at least one embodiment of the present application, the electronic device generating an initial projection image of the first original image based on the first original image, the initial depth image, and the target pose matrix includes:

The electronic device acquires a target homogeneous coordinate matrix of each pixel in the first original image and acquires a depth value of each pixel in the first original image from the initial depth image. Further, the electronic device calculates projection coordinates of each pixel in the first original image based on the target pose matrix, the target homogeneous coordinate matrix of each pixel, and a depth value of each pixel. Further, the electronic device obtains the initial projection image by arranging each pixel according to the projection coordinates of each pixel.

The depth value refers to a pixel value of each pixel in the initial depth image.

Specifically, a formula for calculating a projected coordinate of each pixel in the initial projected image is:

$$P=K*\text{pose}*Z*K^{-1}*H;$$

Wherein, P represents the projected coordinate of each pixel, K represents the internal parameter matrix of the camera device, pose represents the target pose matrix, $K^{-1}$ represents the inverse matrix of K, and H represents the target homogeneous coordinate matrix of each pixel in the first original image. Z represents the depth value of the corresponding pixel in the initial depth image.

At block 107, the electronic device recognizes a target image of the first original image and a target projection image of the initial projection image according to the pose absolute value matrix and a preset threshold matrix.

In at least one embodiment of the present application, the preset threshold matrix refers to a preset matrix with the same dimension as the pose absolute value matrix, and the preset threshold matrix includes a plurality of thresholds.

In at least one embodiment of the present application, the electronic device recognizing a target image of the first original image and a target projection image of the initial projection image according to the pose absolute value matrix and a preset threshold matrix includes:

The electronic device compares each pose absolute value in the pose absolute value matrix with a corresponding threshold in the preset threshold matrix. When there is at least one pose absolute value in the pose absolute value matrix greater than the corresponding threshold, the electronic device determines the first static image as the target image, recognizes dynamic positions of the dynamic objects in the first original image, determines the area corresponding to the dynamic position in the initial projection image as the projection object, and performs mask processing on the projection object to obtain the target projection image. When each pose absolute value in the pose absolute value matrix is less than or equal to the corresponding threshold, the electronic device determines the first original image as the target image and determines the initial projection image as the target projected image.

Through the above-mentioned embodiments, when there is at least one pose absolute value that is greater than the corresponding threshold, it is determined that the dynamic objects move, and the first static image is determined to be the target image. A mask processing is performed on the dynamic objects corresponding to the dynamic category in the initial projection image. Since the positions of the dynamic objects corresponding to the dynamic category will change, the depth values of the pixels corresponding to the dynamic objects will change. When calculating the loss value, the depth value is not used for calculation, so that the calculation of the loss value is not affected by the moving dynamic objects. When all the pose absolute values in the pose absolute value matrix are less than or equal to the corresponding threshold, it is determined that the dynamic object has not moved. Determining the first original image as the target image and determining the initial projection image as the target projection image can accurately calculate the loss value.

At block 108, the electronic device obtains a depth recognition model by adjusting the depth recognition network, based on a gradient error between the initial depth image and the target image and a photometric error between the target projection image and the target image.

In at least one embodiment of the present application, the depth recognition model refers to a model generated by adjusting the depth recognition network.

In at least one embodiment of the present application, the electronic device obtaining a depth recognition model by adjusting the depth recognition network based on a gradient error between the initial depth image and the target image and a photometric error between the target projection image and the target image includes:

The electronic device calculates a depth loss value of the depth recognition network based on the gradient error and the photometric error. Further, the electronic device obtains the depth recognition model by adjusting the depth recognition network based on the depth loss value until the depth loss value is reduced to a minimum.

Specifically, a formula for calculating the depth loss value is:

$$Lc=Lt+Ls;$$

Wherein, Lc represents the depth loss value, Lt represents the photometric error, and Ls represents the gradient error.

Wherein, a formula for calculating the photometric error is:

$$t = \alpha \frac{1 - SSIM(x, y)}{2} + (1-\alpha)\|x_i - y_i\|;$$

Wherein, Lt represents the photometric error, $\alpha$ is a preset balance parameter which generally takes a value of 0.85, SSIM(x,y) represents the structural similarity index between the target projection image and the target image, and $\|x_i-y_i\|$ represents a grayscale difference between the target projection image and the target image. $x_i$ represents a pixel value of the i-th pixel of the target projection image, and $y_i$ represents a pixel value of a pixel corresponding to the i-th pixel in the target image.

Wherein, a formula for calculating the structural similarity index is:

$$SSIM(x, y) = \frac{(2\mu_x\mu_y + c_1)(2\sigma_{xy} + c_2)}{(\mu_x^2 + \mu_x^2 + c_1)(\sigma_x^2 + \sigma_y^2 + c_2)};$$

$$c_1 = (K_1 L)^2;$$

$$c_2 = (K_2 L)^2;$$

Wherein, SSIM(x,y) is the structural similarity index, x is the target projection image, y is the target image, $\mu_x$ is a grayscale average value of the target projection image, and $\mu_y$ is a grayscale average value of the target image. $\sigma_x$ is a grayscale standard deviation of the target projection image, $\sigma_y$ is a grayscale standard deviation of the target image, and $\sigma_{xy}$ is a grayscale covariance between the target projection image and the target image. Both $c_1$ and $c_2$ are preset parameters, L is a maximum pixel value in the target image, $K_1$ and $K_2$ are preset constants, and $K_1 \ll 1$, $K_2 \ll 1$.

A formula for calculating the gradient error is:

$$Ls = \sum\nolimits_{i \in \{x,y\}} \left| \partial_i \left( \frac{1}{D(u, v)} \right) \right| e^{-\|\partial_i I(u,v)\|};$$

Wherein, Ls represents the gradient error, x represents the initial depth image, y represents the target image, and D(u, v) represents a pixel coordinate of the i-th pixel in the initial depth image. I(u, v) represents a pixel coordinate of the i-th pixel in the target image.

Through the above-mentioned embodiments, since the moving dynamic objects have no effect on the calculation of the loss value of the depth recognition network, the accuracy of the depth recognition model can be improved.

At block 109, the electronic device obtains a target depth image and depth information of the image to be recognized by inputting the image to be recognized into the depth recognition model.

In at least one embodiment of the present application, the target depth image refers to an image containing depth information of each pixel in the image to be recognized. The depth information of each pixel in the image to be recognized refers to a distance between a to-be-recognized object corresponding to each pixel in the image and the camera device.

In at least one embodiment of the present application, the method of generating the target depth image is basically the same as the method of generating the initial depth image, so the present application is not repeated here.

In at least one embodiment of the present application, the electronic device acquires the pixel value of each pixel in the target depth image as the depth information of the corresponding pixel in the image to be recognized.

Through the above-mentioned embodiments, since the precision of the depth recognition model is improved, the precision of the depth recognition of the image to be recognized can be improved.

The present application processes the first original image and can accurately determine the dynamic objects and static objects in the first original image. When there is at least one absolute value of the pose that is greater than the corresponding threshold, it is determined that the dynamic objects are moving, and when all the absolute values of the pose in the pose absolute matrix are less than or equal to the corresponding threshold, it is determined that the dynamic objects are not moving, so dynamic objects that do not move in the original images are not masked. When the dynamic objects in the first original image are moving, the dynamic objects in the first original image are masked to obtain a target image, and the dynamic objects in the initial projection image are masked to obtain the target projection image. Based on the gradient error between the initial depth image and the target image and the photometric error between the target projection image and the target image, the depth recognition network is adjusted to obtain the depth recognition model. Since the adjustment of the deep neural network based on the gradient error and the photometric error does not apply masking on the dynamic objects that do not move in the original image, the accuracy of the depth recognition model can be improved, thus, the accuracy of the depth recognition of the image can be improved.

Figure 4:
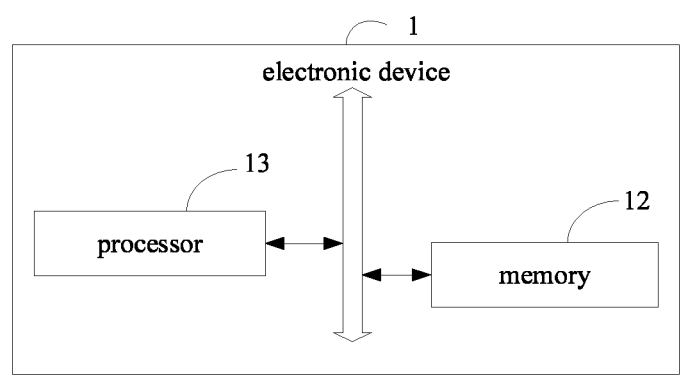
FIG. 4 is a structure diagram of the electronic device provided in an embodiment of the present application.

FIG. 4 shows a structure of the electronic device provided in an embodiment of the present application.

The electronic device 1 includes, but is not limited to, a memory 12, a processor 13, and a computer program that is stored in the memory 12 and can run on the processor 13, such as a depth recognition program.

In at least one embodiment, the electronic device 1 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the electronic device 1 is merely an example, and other examples may be included in the scope of the present disclosure and are thus included in the reference.

In some embodiments, the memory 12 can be used to store program codes of computer readable programs and various data, and automatically access the programs or data with high speed during the running of the electronic device 1. The memory 12 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the electronic device 1 that can be used to carry or store data.

The processor 13 acquires an operating system and various installed applications of the electronic device 1. The processor 13 acquires application programs to implement the steps in each of the above embodiments of the image depth recognition method, for example, the steps shown in FIG. 2.

In some embodiments, the at least one processor 13 may be composed of an integrated circuit for example, or may be composed of a single packaged integrated circuit, or multiple integrated circuits of same function or different functions. The at least one processor 13 can include one or more central processing units (CPU), a microprocessor, a digital processing chip, a graphics processor, and various control chips. The at least one processor 13 is a control unit of the electronic device 1, which connects various components of the electronic device 1 using various interfaces and lines. By running or executing a computer program or modules stored in the memory 12, and by invoking the data stored in the memory 12, the at least one processor 13 can perform various functions of the electronic device 1 and process data of the electronic device 1. For example, the processor 13 may perform the function of image depth recognition shown in FIG. 2.

The program codes are stored in memory 12 and at least one processor 13 may invoke the program codes stored in memory 12 to perform the related function. The program codes stored in the memory 12 can be executed by at least one processor 13, so as to realize the function of each module to achieve the purpose of image depth recognition shown in FIG. 2.

In one embodiment of this application, the memory 12 stores at least one instruction, and the at least one instruction is executed by the at least one processor 13 for the purpose of image depth recognition shown in FIG. 2.

The memory 12 in the electronic device 1 stores a plurality of instructions to realize an image depth recognition method, and the processor 13 can obtain the plurality of instructions to: obtain an image to be recognized, a first original image and a second original image, and obtain a depth recognition network and a pose network; obtain an initial depth image by performing a depth recognition on the first original image based on the depth recognition network; obtain a first static image and a first dynamic image corresponding to the first original image by processing the first original image, and obtain a second static image and a second dynamic image corresponding to the second original image by processing the second original image. Further, generate a pose absolute value matrix based on the first static image, the first dynamic image, the second static image, the second dynamic image and the pose network; input the first original image and the second original image into the pose network and obtain a target pose matrix correspondingly; generate an initial projection image of the first original image based on the first original image, the initial depth image, and the target pose matrix; recognize a target image of the first original image and a target projection image of the initial projection image according to the pose absolute value matrix and a preset threshold matrix; obtain a depth recognition model by adjusting the depth recognition network based on a gradient error between the initial depth image and the target image and a photometric error between the target projection image and the target image; and obtain a target depth image and depth information of the image to be recognized by inputting the image to be recognized into the depth recognition model.

Specifically, for the specific implementation method of the above-mentioned instruction by the processor 13, reference may be made to the description of the relevant steps in the embodiment of FIG. 2, which is not repeated here.

Although not shown, the electronic device 1 may further include a power supply (such as a battery) for powering various components. Preferably, the power supply may be logically connected to the at least one processor 13 through a power management device, thereby, the power management device manages functions such as charging, discharging, and power management. The power supply may include one or more DC or AC power sources, a recharging device, a power failure detection circuit, a power converter or inverter, a power status indicator, and the like. The electronic device 1 may further include various sensors, such as a BLUETOOTH module, a WI-FI module, and the like, and details are not described herein.

In the several embodiments provided in this disclosure, it should be understood that the devices and methods disclosed can be implemented by other means. For example, the device embodiments described above are only schematic, and the division of the modules is only a logical function division which can be implemented in other ways.

The modules described as separate parts may or may not be physically separate, and the parts displayed as modules may or may not be physical units, that is, may be located in one place, or may be distributed over multiple network units. Part or all of the modules can be selected according to the actual needs to achieve the purpose of this embodiment.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The above integrated modules implemented in the form of function modules may be stored in a storage medium. The above function modules may be stored in a storage medium, and include several instructions to enable a computing device (which may be a personal computer, server, or network device, etc.) or processor to execute the method described in the embodiment of the present disclosure.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names but not to signify any particular order.

The above describes embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. An image depth recognition method by using an electronic device, the method comprising:
   obtaining an image to be recognized, a first original image and a second original image, and obtaining a depth recognition network and a pose network;
   obtaining an initial depth image by performing a depth recognition on the first original image based on the depth recognition network;
   obtaining a first static image and a first dynamic image corresponding to the first original image by processing the first original image, and obtaining a second static image and a second dynamic image corresponding to the second original image by processing the second original image;

generating a pose absolute value matrix based on the first static image, the first dynamic image, the second static image, the second dynamic image and the pose network;

inputting the first original image and the second original image into the pose network and obtaining a target pose matrix correspondingly;

generating an initial projection image of the first original image based on the first original image, the initial depth image and the target pose matrix;

recognizing a target image of the first original image and a target projection image of the initial projection image according to the pose absolute value matrix and a preset threshold matrix;

obtaining a depth recognition model by adjusting the depth recognition network, based on a gradient error between the initial depth image and the target image and a photometric error between the target projection image and the target image; and obtaining a target depth image and depth information of the image to be recognized by inputting the image to be recognized into the depth recognition model.

2. The image depth recognition method according to claim 1, wherein obtaining a first static image and a first dynamic image corresponding to the first original image by processing the first original image comprises:

calculating a score value of each pixel in the first original image based on a pixel value of each pixel in the first original image;

based on the score value and a plurality of preset objects, calculating a category probability of each pixel in the first original image on each preset object;

determining a preset object corresponding to a category probability with a largest value as a pixel object corresponding to the pixel;

determining a pixel area comprising the pixels of the same pixel object in the first original image as an initial object;

classifying the initial object according to preset rules, and obtaining dynamic objects corresponding to dynamic categories and static objects corresponding to static categories in the first original image;

performing a mask processing on the dynamic objects in the first original image and obtaining the first static image; and performing the mask processing on the static objects in the first original image and obtaining the first dynamic image.

3. The image depth recognition method according to claim 1, wherein generating a pose absolute value matrix based on the first static image, the first dynamic image, the second static image, the second dynamic image and the pose network comprises:

inputting the first static image and the second static image into the pose network and obtaining a static pose matrix;

inputting the first dynamic image and the second dynamic image into the pose network and obtaining a dynamic pose matrix;

performing a subtraction operation on each matrix element in the static pose matrix and the corresponding matrix element in the dynamic pose matrix and obtaining pose differences;

taking an absolute value of the pose differences and obtaining absolute values of the pose of each matrix element in the static pose matrix;

according to an element position of each matrix element in the static pose matrix, arranging the absolute values of the pose and obtaining the absolute value matrix of the pose.

4. The image depth recognition method according to claim 2, wherein the first original image and the second original image are images captured by a same camera device, wherein inputting the first original image and the second original image into the pose network and obtaining a target pose matrix correspondingly comprising:

determining pixels corresponding to the dynamic objects in the first original image as first pixels;

obtaining a first homogeneous coordinate matrix of the first pixels, and obtaining a second homogeneous coordinate matrix of second pixels in the second original image corresponding to the first pixels;

obtaining an inverse matrix of an internal parameter matrix of the camera device;

calculating first camera coordinates of the first pixels according to the first homogeneous coordinate matrix and the inverse matrix of the internal parameter matrix, and calculating second camera coordinates of the second pixels according to the second homogeneous coordinate matrix and the inverse matrix of the internal parameter matrix;

calculating the first camera coordinates and the second camera coordinates based on a preset epipolar constraint relationship and obtaining a rotation matrix and a translation matrix;

obtaining the target pose matrix by splicing the rotation matrix and the translation matrix.

5. The image depth recognition method according to claim 2, wherein recognizing a target image of the first original image and a target projection image of the initial projection image according to the pose absolute value matrix and a preset threshold matrix comprises:

comparing each pose absolute value in the pose absolute value with a corresponding threshold in the preset threshold matrix;

when there is at least one pose absolute value in the pose absolute value matrix greater than the corresponding threshold, determining the first static image as the target image, and recognizing dynamic positions of the dynamic objects in the first original image, determining the area corresponding to the dynamic position in the initial projection image as the projection object, and performing mask processing on the projection object to obtain the target projection image; or in response that each pose absolute value in the pose absolute value matrix is less than or equal to the corresponding threshold, determining the first original image as the target image, and determining the initial projection image as the target projected image.

6. The image depth recognition method according to claim 1, wherein generating an initial projection image of the first original image based on the first original image, the initial depth image and the target pose matrix comprises:

acquiring a target homogeneous coordinate matrix of each pixel in the first original image, and acquiring a depth value of each pixel in the first original image from the initial depth image;

calculating projection coordinates of each pixel in the first original image based on the target pose matrix, the target homogeneous coordinate matrix of each pixel, and a depth value of each pixel;

obtaining the initial projection image by arranging each pixel according to the projection coordinates of each pixel.

7. The image depth recognition method according to claim 1, wherein obtaining a depth recognition model by adjusting the depth recognition network, based on a gradient error between the initial depth image and the target image and a photometric error between the target projection image and the target image comprises:

calculating a depth loss value of the depth recognition network based on the gradient error and the photometric error;

obtaining the depth recognition model by adjusting the depth recognition network based on the depth loss value until the depth loss value is reduced to a minimum.

8. The image depth recognition method according to claim 7, wherein a formula for calculating the photometric error is:

$$Lt = \alpha \frac{1 - SSIM(x, y)}{2} + (1 - \alpha)\|x_i - y_i\|,$$

in which Lt represents the photometric error, $\alpha$ is a preset balance parameter, SSIM(x,y) represents a structural similarity index between the target projection image and the target image, $\|x_i - y_i\|$ represents a grayscale difference between the projection image and the target image, $x_i$ represents a pixel value of the i-th pixel in the target projection image, and $y_i$ represents a pixel value of a pixel corresponding to the i-th pixel in the target image.

9. An electronic device comprising:

a storage device;

at least one processor; and the storage device storing one or more programs, which when executed by the at least one processor, cause the at least one processor to:

obtain an image to be recognized, a first original image and a second original image, and obtaining a depth recognition network and a pose network;

obtain an initial depth image by performing a depth recognition on the first original image based on the depth recognition network;

obtain a first static image and a first dynamic image corresponding to the first original image by processing the first original image, and obtain a second static image and a second dynamic image corresponding to the second original image by processing the second original image;

generate a pose absolute value matrix based on the first static image, the first dynamic image, the second static image, the second dynamic image and the pose network;

input the first original image and the second original image into the pose network and obtaining a target pose matrix correspondingly;

generate an initial projection image of the first original image based on the first original image, the initial depth image and the target pose matrix;

recognize a target image of the first original image and a target projection image of the initial projection image according to the pose absolute value matrix and a preset threshold matrix;

obtain a depth recognition model by adjusting the depth recognition network, based on a gradient error between the initial depth image and the target image and a photometric error between the target projection image and the target image; and obtain a target depth image and depth information of the image to be recognized by inputting the image to be recognized into the depth recognition model.

10. The electronic device according to claim 9, wherein the at least one processor obtains a first static image and a first dynamic image corresponding to the first original image by processing the first original image by:

calculating a score value of each pixel in the first original image based on a pixel value of each pixel in the first original image;

based on the score value and a plurality of preset objects, calculating a category probability of each pixel in the first original image on each preset object;

determining a preset object corresponding to a category probability with a largest value as a pixel object corresponding to the pixel;

determining a pixel area comprising the pixels of the same pixel object in the first original image as an initial object;

classifying the initial object according to preset rules, and obtaining dynamic objects corresponding to dynamic categories and static objects corresponding to static categories in the first original image;

performing a mask processing on the dynamic objects in the first original image and obtaining the first static image; and performing the mask processing on the static objects in the first original image and obtaining the first dynamic image.

11. The electronic device according to claim 9, wherein the at least one processor generates a pose absolute value matrix based on the first static image, the first dynamic image, the second static image, the second dynamic image and the pose network by:

inputting the first static image and the second static image into the pose network and obtaining a static pose matrix;

inputting the first dynamic image and the second dynamic image into the pose network and obtaining a dynamic pose matrix;

performing a subtraction operation on each matrix element in the static pose matrix and the corresponding matrix element in the dynamic pose matrix and obtaining pose differences;

taking an absolute value of the pose differences and obtaining absolute values of the pose of each matrix element in the static pose matrix;

according to an element position of each matrix element in the static pose matrix, arranging the absolute values of the pose and obtaining the absolute value matrix of the pose.

12. The electronic device according to claim 10, wherein the first original image and the second original image are images captured by a same camera device, wherein the at least one processor inputs the first original image and the second original image into the pose network and obtaining a target pose matrix correspondingly by:

determining pixels corresponding to the dynamic objects in the first original image as first pixels;

obtaining a first homogeneous coordinate matrix of the first pixels, and obtaining a second homogeneous coordinate matrix of second pixels in the second original image corresponding to the first pixels;

obtaining an inverse matrix of an internal parameter matrix of the camera device;

calculating first camera coordinates of the first pixels according to the first homogeneous coordinate matrix and the inverse matrix of the internal parameter matrix, and calculating second camera coordinates of the second pixels according to the second homogeneous coordinate matrix and the inverse matrix of the internal parameter matrix;

calculating the first camera coordinates and the second camera coordinates based on a preset epipolar constraint relationship and obtaining a rotation matrix and a translation matrix;

obtaining the target pose matrix by splicing the rotation matrix and the translation matrix.

13. The electronic device according to claim 10, wherein the at least one processor recognizes a target image of the first original image and a target projection image of the initial projection image according to the pose absolute value matrix and a preset threshold matrix by:

comparing each pose absolute value in the pose absolute value matrix with a corresponding threshold in the preset threshold matrix;

when there is at least one pose absolute value in the pose absolute value matrix greater than the corresponding threshold, determining the first static image as the target image, and recognizing dynamic positions of the dynamic objects in the first original image, determining the area corresponding to the dynamic position in the initial projection image as the projection object, and performing mask processing on the projection object to obtain the target projection image; or in response that each pose absolute value in the pose absolute value matrix is less than or equal to the corresponding threshold, determining the first original image as the target image, and determining the initial projection image as the target projected image.

14. The electronic device according to claim 9, wherein the at least one processor generates an initial projection image of the first original image based on the first original image, the initial depth image and the target pose matrix by:

acquiring a target homogeneous coordinate matrix of each pixel in the first original image, and acquiring a depth value of each pixel in the first original image from the initial depth image;

calculating projection coordinates of each pixel in the first original image based on the target pose matrix, the target homogeneous coordinate matrix of each pixel, and a depth value of each pixel;

obtaining the initial projection image by arranging each pixel according to the projection coordinates of each pixel.

15. The electronic device according to claim 9, wherein the at least one processor obtains a depth recognition model by adjusting the depth recognition network, based on a gradient error between the initial depth image and the target image and a photometric error between the target projection image and the target image by:

calculating a depth loss value of the depth recognition network based on the gradient error and the photometric error;

obtaining the depth recognition model by adjusting the depth recognition network based on the depth loss value until the depth loss value is reduced to a minimum.

16. The electronic device according to claim 15, wherein a formula for calculating the photometric error is:

$$Lt = \alpha \frac{1 - SSIM(x, y)}{2} + (1 - \alpha)\|x_i - y_i\|,$$

in which Lt represents the photometric error, $\alpha$ is a preset balance parameter, SSIM(x,y) represents a structural similarity index between the target projection image and the target image, $\|x_i-y_i\|$ represents a grayscale difference between the projection image and the target image, $x_i$ represents a pixel value of the i-th pixel in the target projection image, and $y_i$ represents a pixel value of a pixel corresponding to the i-th pixel in the target image.

17. A non-transitory storage medium having stored thereon at least one computer-readable instructions, which when executed by a processor of an electronic device, causes the processor to perform an image depth recognition method, wherein the method comprises:

obtaining an image to be recognized, a first original image and a second original image, and obtaining a depth recognition network and a pose network;

obtaining an initial depth image by performing a depth recognition on the first original image based on the depth recognition network;

obtaining a first static image and a first dynamic image corresponding to the first original image by processing the first original image, and obtaining a second static image and a second dynamic image corresponding to the second original image by processing the second original image;

generating a pose absolute value matrix based on the first static image, the first dynamic image, the second static image, the second dynamic image and the pose network;

inputting the first original image and the second original image into the pose network and obtaining a target pose matrix correspondingly;

generating an initial projection image of the first original image based on the first original image, the initial depth image and the target pose matrix;

recognizing a target image of the first original image and a target projection image of the initial projection image according to the pose absolute value matrix and a preset threshold matrix;

obtaining a depth recognition model by adjusting the depth recognition network, based on a gradient error between the initial depth image and the target image and a photometric error between the target projection image and the target image; and obtaining a target depth image and depth information of the image to be recognized by inputting the image to be recognized into the depth recognition model.

18. The non-transitory storage medium according to claim 17, wherein obtaining a first static image and a first dynamic image corresponding to the first original image by processing the first original image comprises:

calculating a score value of each pixel in the first original image based on a pixel value of each pixel in the first original image;

based on the score value and a plurality of preset objects, calculating a category probability of each pixel in the first original image on each preset object;

determining a preset object corresponding to a category probability with a largest value as a pixel object corresponding to the pixel;

determining a pixel area comprising the pixels of the same pixel object in the first original image as an initial object;

classifying the initial object according to preset rules, and obtaining dynamic objects corresponding to dynamic categories and static objects corresponding to static categories in the first original image;

performing a mask processing on the dynamic objects in the first original image and obtaining the first static image; and performing the mask processing on the static objects in the first original image and obtaining the first dynamic image.

19. The non-transitory storage medium according to claim 17, wherein generating a pose absolute value matrix based on the first static image, the first dynamic image, the second static image, the second dynamic image and the pose network comprises:

inputting the first static image and the second static image into the pose network and obtaining a static pose matrix;

inputting the first dynamic image and the second dynamic image into the pose network and obtaining a dynamic pose matrix;

performing a subtraction operation on each matrix element in the static pose matrix and the corresponding matrix element in the dynamic pose matrix and obtaining pose differences;

taking an absolute value of the pose differences and obtaining absolute values of the pose of each matrix element in the static pose matrix;

according to an element position of each matrix element in the static pose matrix, arranging the absolute values of the pose and obtaining the absolute value matrix of the pose.

20. The non-transitory storage medium according to claim 18, wherein the first original image and the second original image are images captured by a same camera device, wherein inputting the first original image and the second original image into the pose network and obtaining a target pose matrix correspondingly comprising:

determining pixels corresponding to the dynamic objects in the first original image as first pixels;

obtaining a first homogeneous coordinate matrix of the first pixels, and obtaining a second homogeneous coordinate matrix of second pixels in the second original image corresponding to the first pixels;

obtaining an inverse matrix of an internal parameter matrix of the camera device;

calculating first camera coordinates of the first pixels according to the first homogeneous coordinate matrix and the inverse matrix of the internal parameter matrix, and calculating second camera coordinates of the second pixels according to the second homogeneous coordinate matrix and the inverse matrix of the internal parameter matrix;

calculating the first camera coordinates and the second camera coordinates based on a preset epipolar constraint relationship and obtaining a rotation matrix and a translation matrix;

obtaining the target pose matrix by splicing the rotation matrix and the translation matrix.

* * * * *